(12) United States Patent
Ulrich

(10) Patent No.: US 10,173,595 B1
(45) Date of Patent: Jan. 8, 2019

(54) PORTABLE TRUCK STEP

(71) Applicant: Walter E. Ulrich, Regina (CA)

(72) Inventor: Walter E. Ulrich, Regina (CA)

( * ) Notice: Subject to any disclaimer, the term of this patent is extended or adjusted under 35 U.S.C. 154(b) by 0 days.

(21) Appl. No.: 15/986,550

(22) Filed: May 22, 2018

(51) Int. Cl.
*B60R 3/02* (2006.01)

(52) U.S. Cl.
CPC ..................... *B60R 3/02* (2013.01)

(58) Field of Classification Search
CPC .................. B60R 3/002; B60R 3/02
USPC ..................... 280/163, 164.1, 166
See application file for complete search history.

(56) References Cited

U.S. PATENT DOCUMENTS

| | | | | |
|---|---|---|---|---|
| 3,853,369 A * | 12/1974 | Holden | ...... | B60R 3/02 182/78 |
| 4,191,388 A * | 3/1980 | Barksdale | ...... | B60R 3/02 182/91 |
| 4,194,754 A * | 3/1980 | Hightower | ...... | B60R 3/02 280/166 |
| 4,639,032 A * | 1/1987 | Barbour | ...... | B60R 3/02 244/129.6 |
| 4,846,487 A * | 7/1989 | Criley | ...... | B60R 3/02 280/166 |
| 5,028,063 A * | 7/1991 | Andrews | ...... | B60R 3/02 182/97 |
| 5,549,312 A * | 8/1996 | Garvert | ...... | B60R 3/02 280/166 |
| 5,732,996 A * | 3/1998 | Graffy | ...... | B60R 3/02 280/166 |
| 5,941,342 A * | 8/1999 | Lee | ...... | B60R 3/02 182/127 |
| 6,116,378 A * | 9/2000 | Barrow | ...... | B60R 3/02 182/127 |
| 6,422,342 B1 * | 7/2002 | Armstrong | ...... | B60R 3/02 182/127 |
| 6,499,564 B2 * | 12/2002 | Puglisi | ...... | B60R 3/007 182/127 |
| 6,640,929 B2 * | 11/2003 | Korpi | ...... | B60R 3/02 182/127 |
| 6,840,526 B2 * | 1/2005 | Anderson | ...... | B60R 3/02 182/127 |
| 6,857,680 B2 * | 2/2005 | Fielding | ...... | B60N 2/3015 280/166 |
| 6,918,624 B2 * | 7/2005 | Miller | ...... | B60P 3/40 182/127 |
| 6,964,444 B2 * | 11/2005 | Chumley | ...... | B60P 3/40 280/166 |
| 6,994,363 B2 * | 2/2006 | Seksaria | ...... | B60P 3/40 280/166 |
| 7,055,838 B2 * | 6/2006 | Lambie | ...... | B60R 3/007 182/127 |
| 7,090,276 B1 * | 8/2006 | Bruford | ...... | B60R 3/02 296/1.02 |
| 7,240,947 B2 * | 7/2007 | Kuznarik | ...... | B60R 3/02 180/127 |
| 7,401,798 B2 * | 7/2008 | Dolan | ...... | B60R 3/02 182/97 |
| 7,401,833 B2 * | 7/2008 | Dryja | ...... | B62D 33/0273 296/61 |

(Continued)

*Primary Examiner* — Jeffrey J Restifo
(74) *Attorney, Agent, or Firm* — Moss & Barnett; Michael A. Bondi

(57) ABSTRACT

A portable apparatus comprising a truck step for use in climbing into a cargo area of a pickup truck is described. The system provides a deployable step system that can be stowed securely out of the way in the cargo area of a pickup truck when not in use.

7 Claims, 2 Drawing Sheets

(56) References Cited

U.S. PATENT DOCUMENTS

| | | | | |
|---|---|---|---|---|
| 7,530,619 B1* | 5/2009 | Bruford | ............... | B60R 3/02 |
| | | | | 296/1.02 |
| 7,673,922 B1* | 3/2010 | Grimes | ............... | B60R 3/02 |
| | | | | 280/166 |
| 7,896,419 B2* | 3/2011 | Elliott | ............... | B62D 33/0273 |
| | | | | 280/166 |
| 7,954,836 B2* | 6/2011 | Mann | ............... | B60R 3/02 |
| | | | | 280/163 |
| 8,091,943 B1* | 1/2012 | Weber | ............... | B60R 3/02 |
| | | | | 280/166 |
| 8,182,013 B1* | 5/2012 | Alvarado | ............... | B60R 3/007 |
| | | | | 182/127 |
| 8,444,201 B1* | 5/2013 | Crawford | ............... | B60R 3/02 |
| | | | | 296/50 |
| 8,505,944 B2* | 8/2013 | Genest | ............... | B60R 3/02 |
| | | | | 280/166 |
| 8,573,673 B1* | 11/2013 | Puglisi, Sr. | ............... | E06C 5/02 |
| | | | | 182/127 |
| 8,919,853 B2* | 12/2014 | Krishnan | ............... | B62D 33/03 |
| | | | | 280/164.1 |
| 8,985,660 B1* | 3/2015 | Weber | ............... | B60R 3/005 |
| | | | | 16/422 |
| 9,022,405 B2* | 5/2015 | Kibler | ............... | B60R 3/02 |
| | | | | 182/127 |
| 9,302,719 B1* | 4/2016 | Krishnan | ............... | B62D 33/0273 |
| 9,315,145 B2* | 4/2016 | Salter | ............... | B60Q 3/30 |
| 10,005,396 B2* | 6/2018 | Spahn | ............... | B62D 33/03 |

\* cited by examiner

PORTABLE TRUCK STEP

FIELD OF THE INVENTION

This invention is in the field of accessories for trucks, in particular accessories to facilitate climbing in and out of cargo areas of trucks.

BACKGROUND

Small trucks colloquially known as pickup truck have been popular with consumers for a number of years. The usual configuration for these trucks include a passenger cab, behind which is located a cargo bed area. For ease of access to the cargo area most truck include a hinged tailgate that can be lowered to permit access to the cargo area, and then raised and locked in place to ensure that materials in the cargo area do not fall out during transport.

Generally, the tailgate lowers from a vertical to a horizontal position, such that the tailgate is at the same plane as the truck bed. However, in the open position the tailgate is positioned several feet above ground level making it difficult and sometimes impossible for users to gain easy access to the cargo area. This is particular a problem when materials being carried in the cargo area are not within the normal reach of the user, or where a user has physical limitations that prevent climbing into the cargo area. In some cases the problem is solved by providing a ladder to step that can simply be carried in the cargo area when not in use. As these are not attached to the truck they present a number of limitations, including being potentially unstable when in use, and taking up storage space in the cargo area when not in use.

A variety of more "permanent" solutions have been devised to permit more convenient access to the cargo area. These include a number of foldable step arrangements, as exemplified in U.S. Pat. Nos. 4,194,754, 3,853,369, 8,444,201, and 5,549,312. While these prior art devices provide a solution to the problem of allowing a user to step up into the cargo area, they all suffer from one or more limitations that detract from their utility. These include such flaws as: permanently mounted to the tailgate, such that they impede the ability to slide cargo out of the cargo area; mounting to the bumper making it impossible to use the step when the tailgate is in the open (horizontal) position; mounting outside the cargo area, subjecting the apparatus to damage from road debris.

Thus, what is needed is a convenient and easy to deploy step that can be used to access the cargo area of a pickup truck, but which does not impede access or egress of material from the cargo area, and which can be safely stowed when not in use.

SUMMARY OF THE INVENTION

The present application discloses a novel step apparatus for use in climbing in and out of the cargo area of a typical pickup truck. The truck step as disclosed herein comprises a mounting frame that can be secured to one of the inner surface of the cargo side panels. A guide pivotally attaches to the mounting frame and accepts a support member that connects to a step portion of the apparatus. The guide includes a hollow channel through which the support member can pass, allowing the support member to slide and back and forth as the step is moved from the stowed to the deployed position and vice versa.

The step is generally in the shape of an open rectangle. The top edge of the step is shaped such that it can engage the edge of the tailgate when deployed. Side members extend downwards to connect with a bottom member, which is what the user will place their foot on when climbing in an out of the cargo area using the step device. The support member connects to one side of the top edge of the step, thus providing tension that supports the weight of the user when they are standing on the step.

Also pivotally attached to the mounting frame is a handle. The handle serves two purposes. First, when the step is deployed the handle can be swung outward and used to assist and stabilize the user as they use the step to climb in and out of the cargo area. Second, when the step is stowed, the handle can be swung inward and serves to secure the other components of the step for storage along the side wall of the truck bed.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

Figure 1:
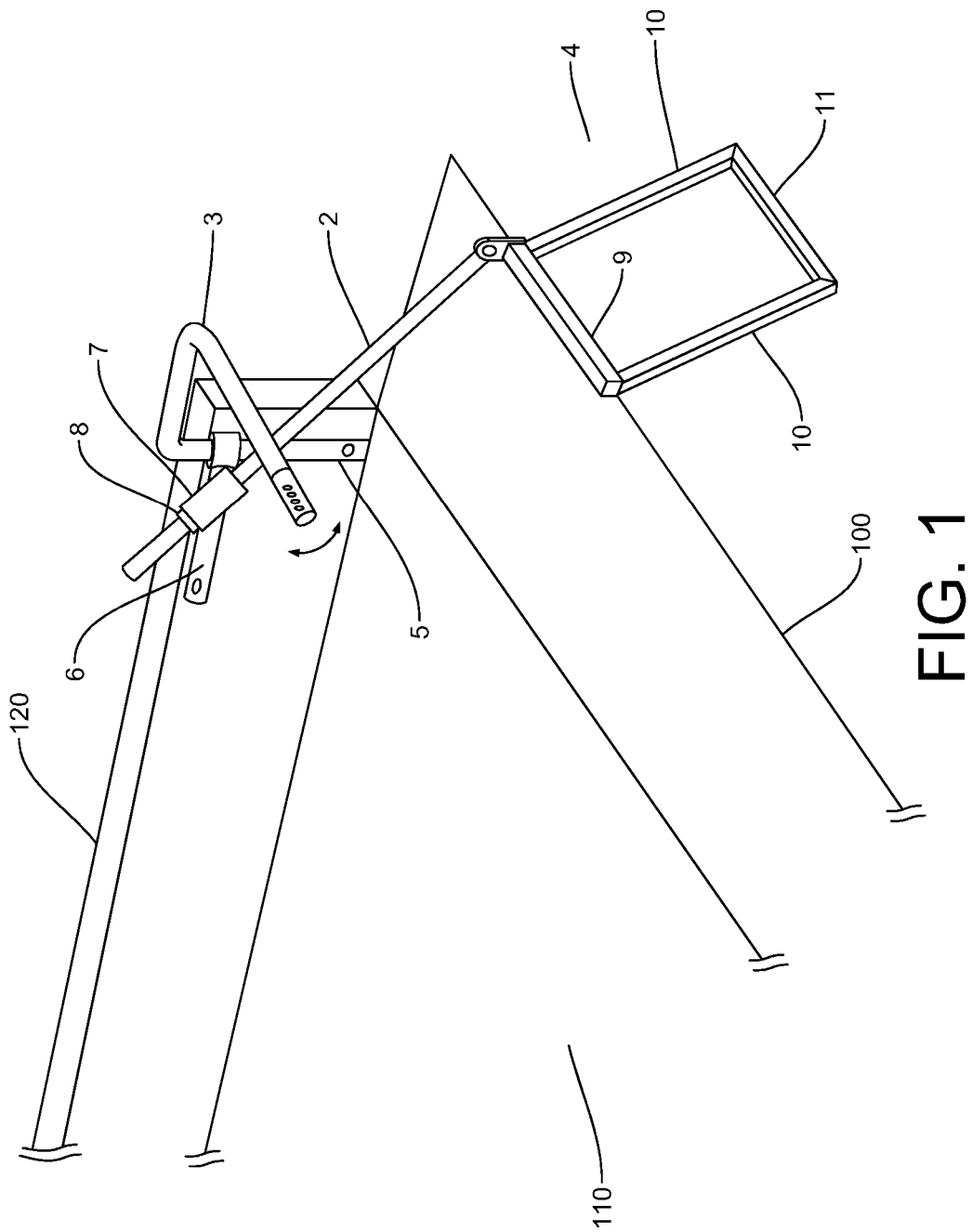
FIG. 1 depicts a perspective view of the apparatus as disclosed herein when in the deployed configuration.

The present disclosure describes a foldable step to permit more convenient access and egress from the cargo area of a pickup truck. In general, the step comprises a mounting frame 1, a support member 2, a handle 3, and a step 4 that engages the edge of a pickup truck tailgate 100 (FIG. 1).

In some embodiments, the mounting frame 2 comprises a vertical member 5 and a horizontal member 6. The two members are secured to each other using typical fasteners such as nuts and bolts, and also to the inner aspect of the cargo bed of a pickup truck. The mounting frame is the only part of the step apparatus that is secured to the truck, and is placed in such a way as to minimize any obstruction of the cargo bed area, unlike many prior art step devices.

Pivotally attached to the mounting frame is a guide member 7. In a preferred embodiment the guide member includes a flat portion that is secured to the mounting frame by a fastener that allows for rotation about the longitudinal axis of the fastener. In addition, the guide member will include a portion that is configured to accept a support member, the support member serving to connect the step part of the apparatus to the mounting frame. In some cases, the portion that accepts the guide member is tubular in shape and open at both ends so as to allow the support member to glide back and forth within the interior of the guide member tube as the step is move from the stowed to deployed positions and back again (FIG. 1).

The support member comprises an elongate, substantially rigid member, that at one end connects to the step portion, and at the opposite end inserts into the tubular portion of the guide member. The support member will also include some form of a stop mechanism 8, such as flange or stop of some kind to prevent the support member from being completely pulled from the guide member. When the step is in use the stop provide a point of resistance such that the step will be maintained in a relatively fixed position with respect to the truck tailgate. In some embodiments the stop mechanism can comprise a flange that is movable along the length of the support member, such that one can pre-select the effective length of the support member when the step assembly is in the deployed condition.

Figure 2:
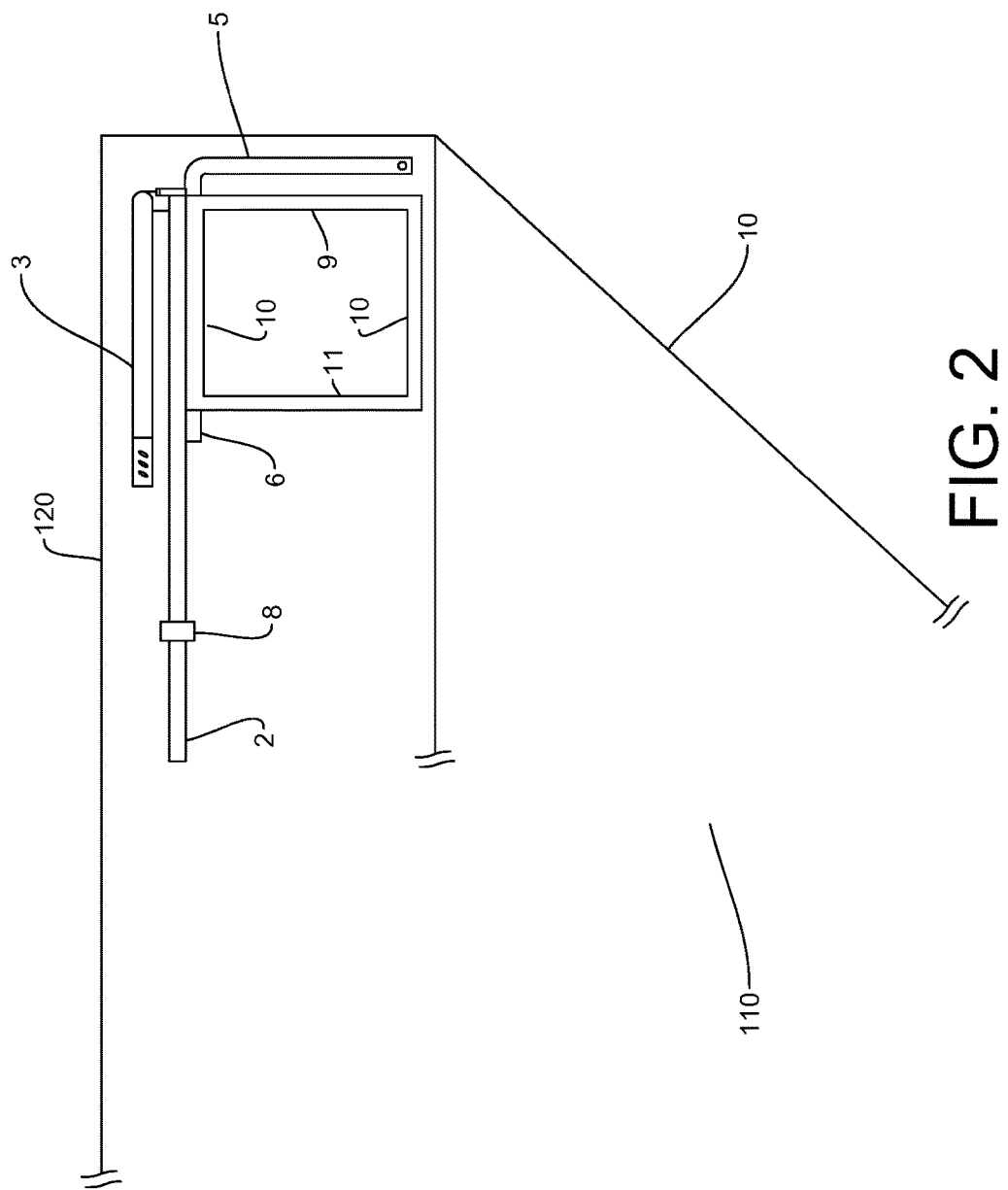
FIG. 2 depicts a side view of the apparatus as disclosed herein when in the stowed configuration.

In some embodiments, it will also be preferable to include a handle. In general, the handle can be pivotally attached to the mounting frame in such a way that it can swing in a plane generally parallel to the floor of the cargo area bed. When the step is in the deployed position, the handle can be move laterally such that it is positioned generally parallel with the edge of the tailgate on which the step is engaged, with some form of structure or stop designed to prevent the handle from being move past this point. When arranged in this way, the handle provides an object that a user can grasp in order to assist either in ascending or descending the step. The handle will assist the user in stabilizing themselves, making the apparatus safer to use than other prior art devices that lack a handle. When the apparatus is placed in the stowed configuration, the handle is designed to be swung inwards and to engage and secure the other components of the step against in the inner aspect of the truck side wall (FIG. 2).

With respect to the step portion of the apparatus, as seen in FIG. 1, the step 4 can be formed in a generally rectangular shape. The step portion comprises a tailgate engagement member 9, configured to be placed and frictionally engage a pickup truck tailgate, when the tailgate is in the open (horizontal position). In some embodiments, the engagement member will have an L-shape, with one leg of the L able to position along the top edge of the tailgate, while the other leg of the L is positioned along what would be considered the inside surface of the tailgate. The corner of the L would thus be positioned at the intersection of the top edge and inner surface of the tailgate, as can be seen in FIG. 1.

Extending downward from the engagement members are two side members 10, one each positioned at opposite ends of the engagement member. The side members can be pivotally connected to the engagement member, such that they can rotate around the longitudinal axis of the fastener that connects each of them to the side members. The side members are in turn connected to each other at their opposite ends by a rung member 11, the rung member being the part of the apparatus that a user will step on or off of when using the apparatus.

By having the side members pivotally connected to the engagement, an additional advantage is gained in that the side members are able to move relative to the engagement member as the step is loaded or unloaded when a user steps on or off the rung. In turn this allows the engagement member to maintain a generally fixed in place positioning with respect to the tailgate, thus providing maximal contact area of the engagement member to the tailgate when the step is in use. Maximizing contact area reduces the risk of movement of the engagement member relative to the tailgate while the step is in use, increasing safety and stability for a user as they climb up and down the step.

When deployed, the engagement member will be placed so as to engage the top edge of the tailgate in the crook of the L-shaped engagement member. The support member will slide with respect to the guide as the step is removed from its stowed position for placement on the tailgate. As described above, the support member will be configured such that when the engagement member is in place on the edge of the tailgate, the support member will reach the stop such that further movement of the step portion will be substantially prevented. In addition, as a user steps onto the rung, the weight of the user will create a force vector that is transmitted through the support member to the mounting frame, the net effect of which will be to force the engagement portion of the step more securely up against the tailgate. The support member in this case will in effect behave as a fixed length member, and will thus substantially resists any further downward movement of the rung as a user steps onto it. Once the step is in place, the user may also optionally swing the handle outward award from the sidewall of the truck bed in order to provide a handhold for further stability when ascending or descending using the step, and/or to assist the user in pulling themselves up into the cargo bed, or lowering themselves upon exiting the cargo bed.

For stowage, the process is effectively reversed. Because the step is not fastened to the tailgate, once it is no longer needed, a user simply lifts the step portion to remove the engagement member from the tailgate. The step and its connected support member are then slid through the guide member in order to move the step portion from outside the cargo area into the interior of the cargo area. Conveniently, the step portion and guide member can be folder relative to each, and then rotated 90° in order to place the step portion up against the side wall of the cargo bed, as shown in FIG. 2.

As also depicted, the handle that then be swing inwards and used to secure the step portion in the stowed position. In a preferred embodiment, the step portion will be sized such that it will fit within the sidewall space of the cargo bed, between the wheel well and the end of the cargo bed. Thus, the apparatus is positioned so that it does not reduce the amount of usable cargo space, and does not impeded the opening and/or closing of the tailgate. Further, as the step is secured by the handle, it is safely stowed and is not loose, preventing movement around the cargo areas, or potentially ejection as can occur with free ladders or steps that are simply put into the cargo area without being secured. In some embodiments the handle and its attachment to the mounting frame can include a detent mechanism such that the handle will generally remain in a desired position when moved to a detent corresponding to that handle position. Such detents can include spring loaded bearing and detents and like mechanisms.

The above description is intended to enable a person of skill in the art to practice the invention. It is not intended to detail all possible variations and modifications that might become apparent to one of skill in the art upon reading the description of the invention as presented herein. It will be apparent to those skilled in the art that many more modifications besides those already described are possible without departing from the inventive concepts herein. The inventive subject matter, therefore, is not to be restricted except in the scope of any claims based on the description as provided herein. Moreover, in interpreting both the description and any claims issuing therefrom, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A portable step assembly for use on a pickup truck having a tailgate and a cargo area, the step assembly comprising:
   a step portion configured to engage the tailgate, the step portion further comprising a tailgate engagement member step that engages the trailing edge of the tailgate, a rung member, and a plurality of side members connecting the rung member to the tailgate engagement member;
   a mounting frame, the mounting frame comprising at least one vertical member, and at least one horizontal member, the mounting frame configured to provide a point of securement for the portable step assembly to an interior aspect of a side wall of the cargo area;
   a support member, the support member pivotally attached at one end of the tailgate engagement member and configured to connect the step portion to the mounting frame by way of a guide member mounted on the mounting frame, wherein the guide member comprises a hollow tube, the interior of the tube forming a passage that slidably engages the support member;
   wherein the step assembly is adapted to be moved between a stowed condition and a deployed condition, and wherein when the step assembly is in the deployed condition the step portion hangs downward towards the ground and is disposed to support substantially all the weight of a user as an aid for entry into, or egress from, the cargo area.

2. The step assembly of claim 1, further comprising a stop mechanism that is operative to restrict the range of motion of the support member within the guide member, thus limiting the extent to which the step portion can extended downwards from the tailgate.

3. The step assembly of claim 2, wherein the stop mechanism comprises a moveable flange.

4. The step assembly of claim 1, wherein the support member further comprises a handle, the handle configured to support a portion of the weight of a user who uses the step to enter into or out of the cargo area.

5. The step assembly of claim 4, wherein the handle is further configured to secure the step assembly in the stowed position within the interior of the cargo area when the step is not in use.

6. The step assembly of claim 4, wherein the handle is pivotally attached to the mounting frame.

7. The step assembly of claim 4, wherein the mounting frame and handle further comprise a complimentary detent mechanism operative to substantially maintain the handle in a desired position relative to the mounting frame when placed there by a user.

* * * * *